US011760296B2

(12) United States Patent
Jang et al.

(10) Patent No.: US 11,760,296 B2
(45) Date of Patent: Sep. 19, 2023

(54) VEHICULAR AIRBAG DEVICE

(71) Applicant: Autoliv Development AB, Vargarda (SE)

(72) Inventors: Dong Hyun Jang, Hwaseong-si (KR); Seung Jin Lee, Hwaseong-si (KR); Dong Young Kim, Hwaseong-si (KR)

(73) Assignee: Autoliv Development AB, Vargarda (SE)

( * ) Notice: Subject to any disclaimer, the term of this patent is extended or adjusted under 35 U.S.C. 154(b) by 88 days.

(21) Appl. No.: 17/310,766

(22) PCT Filed: Dec. 4, 2019

(86) PCT No.: PCT/KR2019/016991
§ 371 (c)(1),
(2) Date: Aug. 23, 2021

(87) PCT Pub. No.: WO2020/175771
PCT Pub. Date: Sep. 3, 2020

(65) Prior Publication Data
US 2022/0126776 A1    Apr. 28, 2022

(30) Foreign Application Priority Data
Feb. 26, 2019    (KR) .................. 10-2019-0022463

(51) Int. Cl.
*B60R 21/207*    (2006.01)
*B60R 21/231*    (2011.01)
(Continued)

(52) U.S. Cl.
CPC .......... *B60R 21/207* (2013.01); *B60R 21/233* (2013.01); *B60R 21/2338* (2013.01);
(Continued)

(58) Field of Classification Search
CPC ........ B60R 2021/23146; B60R 21/207; B60R 2021/2074; B60R 2021/0058; B60R 2021/23161; B60R 21/23138
See application file for complete search history.

(56) References Cited

U.S. PATENT DOCUMENTS

| | | | |
|---|---|---|---|
| 7,549,672 B2 * | 6/2009 | Sato .................... | B60R 21/2338 |
| | | | 280/730.2 |
| 2018/0126941 A1 * | 5/2018 | Faruque ............... | B60R 21/237 |

(Continued)

FOREIGN PATENT DOCUMENTS

| | | |
|---|---|---|
| JP | 2004-189216 A | 7/2004 |
| JP | 2008-114631 A | 5/2008 |

(Continued)

*Primary Examiner* — Drew J Brown
*Assistant Examiner* — Matthew Joseph Ganci
(74) *Attorney, Agent, or Firm* — Harness, Dickey & Pierce, P.L.C.

(57) ABSTRACT

The present disclosure relates to an airbag apparatus for a vehicle, which includes: an airbag cushion which is inflated and deployed in a forward direction from both sides of a passenger upon vehicle collision to protect both sides of the passenger; and an inflater configured to generate gas by an impact detection signal and to supply the gas to the airbag cushion, wherein the airbag cushion includes a first airbag configured to protect both sides or one side from passenger's shoulder to passenger's lower body part; and a second airbag configured to protect passenger's head and both sides of passenger's shoulder, and can restrict and protect passenger's upper body and lower body by inflating and deploying the first and second airbags toward both sides of the passenger upon vehicle collision.

13 Claims, 6 Drawing Sheets

(51) Int. Cl.
*B60R 21/233* (2006.01)
*B60R 21/2338* (2011.01)
*B60R 21/2342* (2011.01)
*B60R 21/00* (2006.01)

(52) U.S. Cl.
CPC .... *B60R 21/2342* (2013.01); *B60R 21/23138* (2013.01); *B60R 2021/0006* (2013.01); *B60R 2021/0048* (2013.01); *B60R 2021/0058* (2013.01); *B60R 2021/2074* (2013.01); *B60R 2021/23107* (2013.01); *B60R 2021/23146* (2013.01)

(56) References Cited

U.S. PATENT DOCUMENTS

| | | | | |
|---|---|---|---|---|
| 2018/0194317 A1* | 7/2018 | Barbat | ................ | B60R 21/207 |
| 2018/0236962 A1* | 8/2018 | Ohno | ................ | B60R 21/207 |
| 2019/0016293 A1* | 1/2019 | Saso | ................ | B60R 21/264 |
| 2019/0054890 A1* | 2/2019 | Kwon | ............... | B60R 21/23138 |

FOREIGN PATENT DOCUMENTS

| | | | |
|---|---|---|---|
| JP | 2016-203945 A | 12/2016 | |
| JP | 2017-124759 A | 7/2017 | |
| KR | 1020140144162 A | 10/2014 | |
| KR | 1020140156931 B1 | 9/2016 | |

* cited by examiner

VEHICULAR AIRBAG DEVICE

TECHNICAL FIELD

The present disclosure relates to an airbag apparatus for a vehicle, and more particularly, to an airbag apparatus for a vehicle which restricts and protects a passenger by being inflated and deployed upon vehicle collision.

BACKGROUND ART

In general, a vehicular airbag apparatus is a safety device that protects a passenger by injecting gas into an airbag according to a signal of an impact detection sensor upon vehicle collision, and rapidly inflating the airbag.

Such an airbag apparatus is installed in a steering wheel, a dashboard, a seat, a sidewall, etc. provided in a vehicle, and protects a passenger by being inflated toward a front side or side of the passenger upon vehicle collision.

That is, a vehicle may be provided with a frontal airbag which is deployed in front of a driver seat and a passenger seat, a curtain airbag and a side airbag which are deployed from a side of a passenger to protect the passenger, and a knee airbag for protecting passenger's knees, etc.

Recently, autonomous vehicles moving by themselves without drivers' driving are developing.

The autonomous vehicle detects a condition of each device provided in the vehicle and a condition around the vehicle, by using a high-tech sensor for recognizing things around the vehicle and a high-performance graphic processing device, and travels while controlling an operation of each device provided in the vehicle according to a result of detecting.

The high-tech sensor may measure a distance between things like a human being, and may detect a danger and help the vehicle view all areas without a blind zone. In addition, the graphic processing device may grasp a surrounding environment of the vehicle through several cameras, and may analyze an image thereof and help the vehicle safely travel.

For example, the autonomous vehicle may have a LiDAR device, a sound wave device, a 3D camera, a radar device, etc. mounted therein.

As the autonomous vehicles configured as described above do not require drivers to drive, all seats including a driver seat can freely rotate and an angle of a backrest can be adjusted to be horizontal by a tilting operation.

A passenger can adjust the angle of the backrest variously, and may rotate the seat and may have a meeting facing a passenger on a back seat.

Accordingly, it is impossible to apply a normal airbag apparatus which is designed with reference to a posture of a passenger sitting on a seat facing forward to the autonomous vehicles.

Patent document 1 and patent document 2 presented below disclose a passenger protection system configuration for a vehicle.

As a passenger riding in an autonomous vehicle does not directly drive, the passenger may have a meeting by swiveling a seat in a horizontal direction while moving to a destination, or may have a rest by reclining a backrest backward.

As the seat and the backrest can be freely rotated in the forward and backward directions and in the horizontal direction in the autonomous vehicle, the direction and the posture of the passenger can be variously changed.

Accordingly, there is a demand for airbag technology for safely protecting a passenger regardless of a direction and a posture of the passenger upon vehicle collision.

CITED REFERENCES (Patent Document 1) Korean Patent Registration No. 10-1655569 (published on Sep. 8, 2016)
(Patent Document 2) Korean Patent Registration No. 10-1611087 (published on Apr. 11, 2016)

DISCLOSURE OF INVENTION

Technical Problem

An object of the present disclosure is to solve the above-described problems, and is to provide an airbag apparatus for a vehicle which protects a passenger by being inflated and deployed toward both sides of the passenger upon vehicle collision.

Another object of the present disclosure is to provide an airbag apparatus for a vehicle which can safely protect a passenger by inflating and deploying a plurality of pairs of airbag cushions from both sides of a seat.

Solution to Problem

To achieve the above-described objects, an airbag apparatus for a vehicle according to the present disclosure may include: an airbag cushion which is inflated and deployed in a forward direction from both sides of a passenger upon vehicle collision to protect both sides of the passenger; and an inflater configured to generate gas by an impact detection signal and to supply the gas to the airbag cushion, and the airbag cushion may include a first airbag configured to protect both sides or one side from passenger's shoulder to passenger's lower body part; and a second airbag configured to protect passenger's head and both sides of passenger's shoulder.

Advantageous Effects of Invention

According to the airbag apparatus for the vehicle according to the present disclosure as described above, there is an effect that the first and second airbags are inflated and deployed toward both sides of a passenger upon vehicle collision, and restrict and protect passenger's upper body and lower body.

That is, according to the present disclosure, the first airbag is installed in the backrest of the seat of the vehicle, and the second airbag is installed in the headrest, so that there is an effect that passenger's body and head can be restricted upon vehicle collision.

In particular, according to the present disclosure, the second airbag is disposed to overlap the upper end of the first airbag, so that there is an effect that movement of the passenger caused by lateral collision of the vehicle can be effectively prevented or restrained.

Accordingly, there is an effect that a passenger can be effectively restricted and safely protected in a state where a seat and a backrest are rotated in various directions and angles in an autonomous vehicle.

BEST MODE FOR CARRYING OUT THE INVENTION

Figure 1:
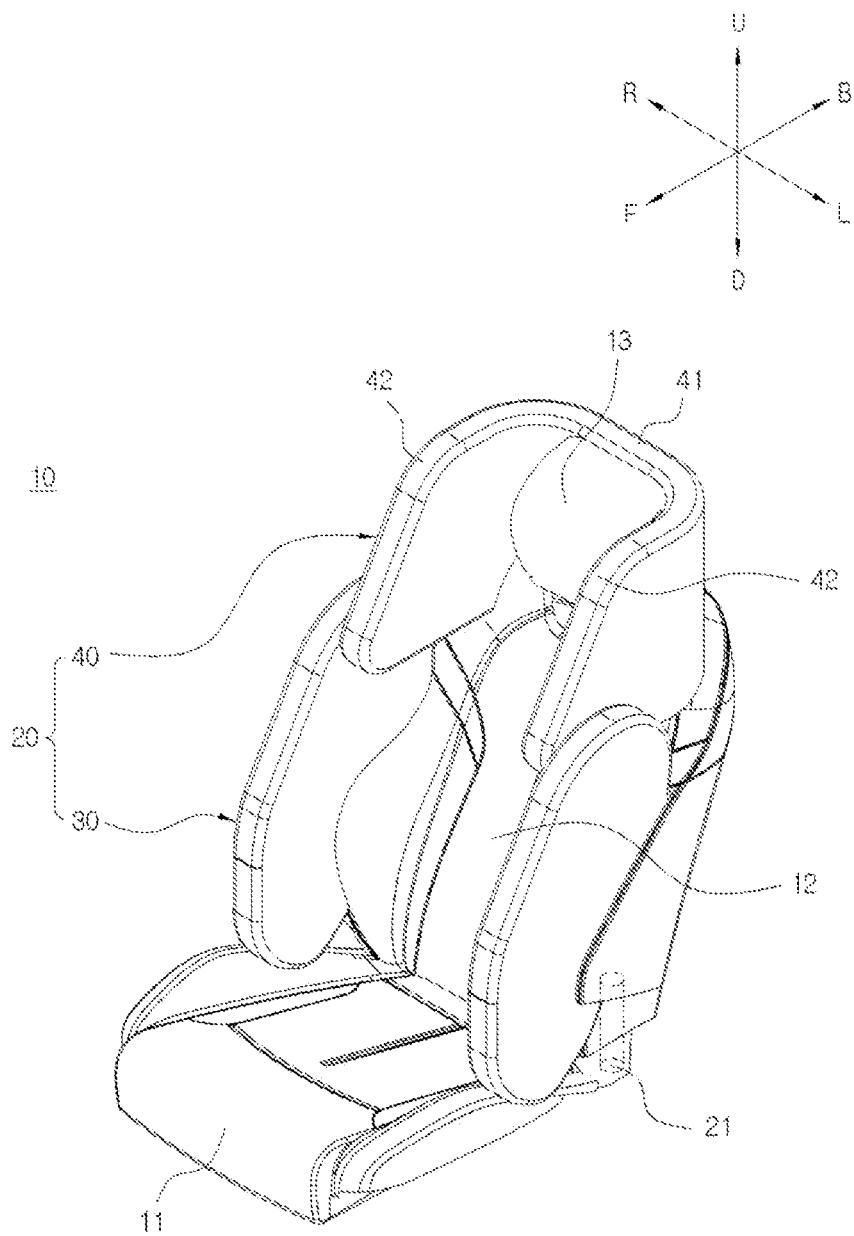
FIG. 1 is a perspective view of an airbag apparatus for a vehicle according to a preferred embodiment of the present disclosure.

Hereinafter, an airbag apparatus for a vehicle according to preferred embodiments of the present disclosure will be described in detail with reference to the accompanying drawings.

The present disclosure safely protects a passenger by restricting the whole of passenger's upper body and lower body by inflating and deploying airbag cushions toward both sides of the upper body including passenger's head and chest with reference to passenger's both shoulders, and both sides of the lower body including passenger's pelvis and hip.

In particular, the present disclosure can protect passenger's front by inflating and deploying airbag cushions to enclose the front along with both sides of the passenger upon vehicle collision, and can prevent an injury from occurring by a flying object or a broken part in the vehicle.

In addition, the present disclosure can prevent a submarine phenomenon that a passenger moves forward upon a frontal crash of a vehicle by inflating and deploying an airbag cushion upward from a front lower portion of passenger's pelvis and hip.

In addition, the present disclosure can safely protect a passenger on a back seat by buffering when the passenger on the back seat collides with a backrest, by inflating and deploying an airbag cushion from a rear surface of the back rest of the seat.

In the present embodiment, a configuration of an airbag apparatus installed in a driver seat of a normal vehicle will be described, and a direction of facing a front surface of the vehicle with reference to a driver seat will be referred to as a 'forward direction (F),' and a direction of facing a rear surface of the vehicle will be referred to as a 'backward direction (B)'. Along with these terms, terms indicating directions such as 'left side (L),' 'right side (R),' 'upward direction (U),' and 'downward direction (D)' are defined to indicate respective directions with reference to the forward direction and the backward direction described above. In addition, reference sign I shown in the drawings indicates an inward direction of the vehicle in a width direction of the vehicle, and reference sign O indicates an outward direction of the vehicle in the width direction of the vehicle.

Figure 2:
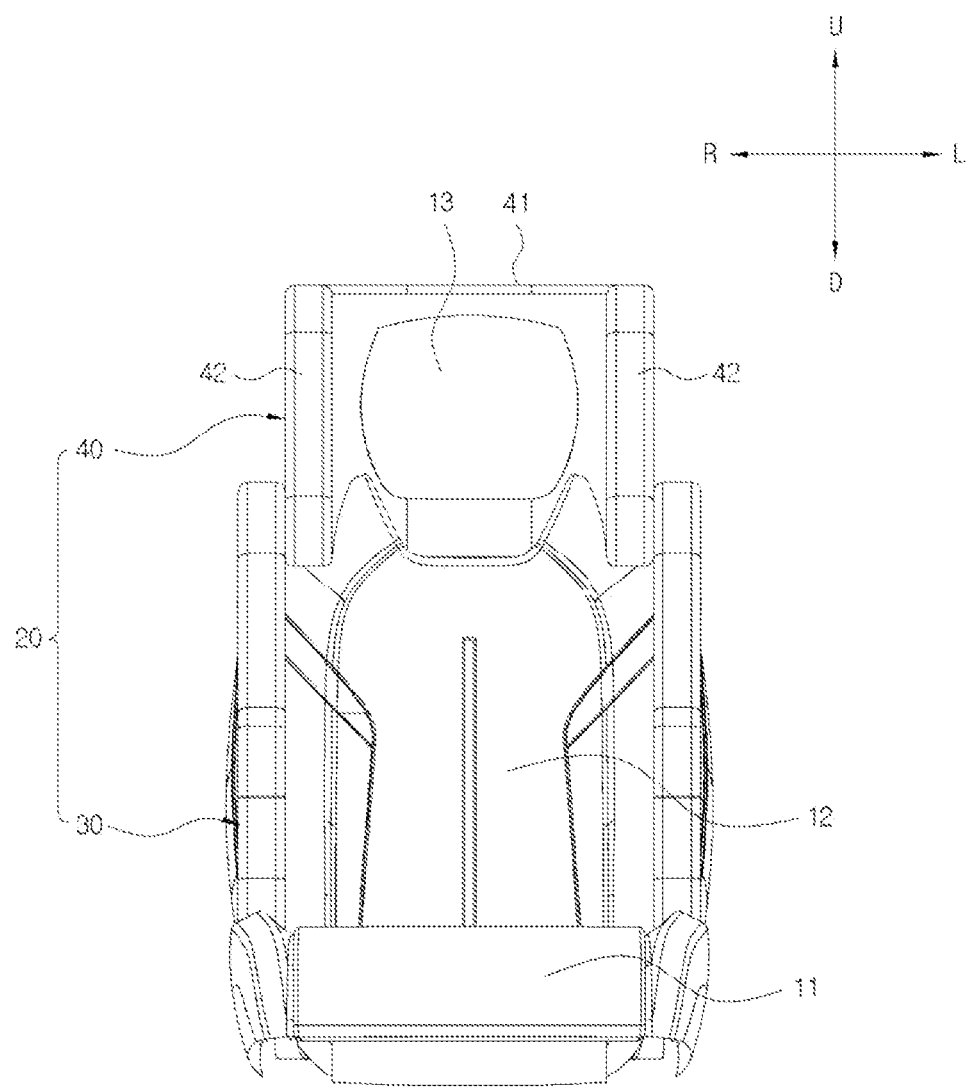
FIGS. 2 and 3 are a front view and a plane view of the airbag apparatus for the vehicle shown in FIG. 1, respectively.
Figure 3:
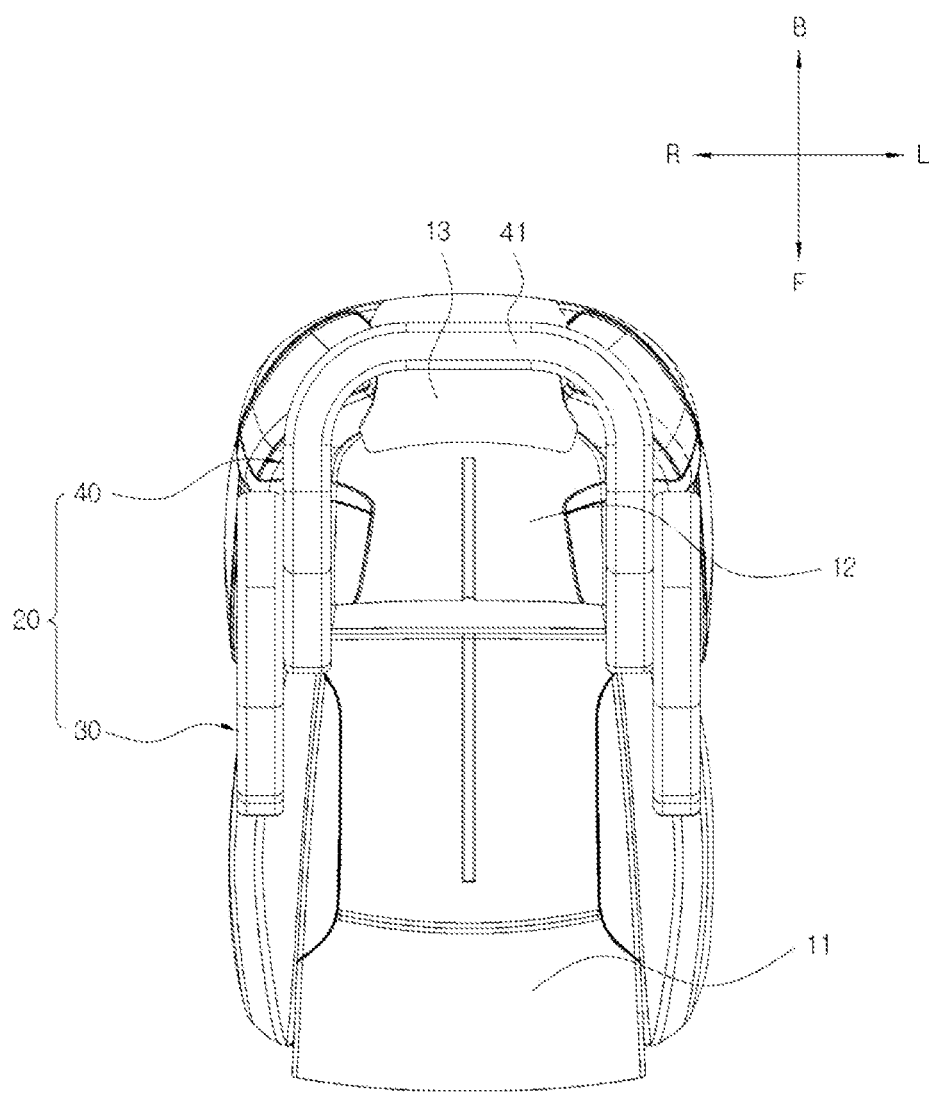

FIG. 1 is a perspective view of an airbag apparatus for a vehicle according to a preferred embodiment of the present disclosure, and FIGS. 2 and 3 are a front view and a plane view of the airbag apparatus for the vehicle shown in FIG. 1, respectively.

As shown in FIGS. 1 to 3, the airbag apparatus 10 for the vehicle according to a preferred embodiment of the present disclosure includes an airbag cushion 20 which is inflated and deployed in the forward direction from both sides of a passenger upon vehicle collision to protect both sides of the passenger, and an inflater 21 which generates gas by an impact detection signal and supplies the gas to the airbag cushion 20.

The airbag cushion 20 may be inflated and deployed in the forward direction from both sides of the passenger to correspond to an upper body part including passenger's head and chest, abdomen with reference to passenger's shoulder, and a lower body part including passenger's pelvis and hip.

To achieve this, the airbag cushion 20 may include one pair of first airbags 30 to protect both sides of the lower body part from the passenger's shoulder, and a second airbag 40 to protect passenger's head and both sides of the upper end of passenger's shoulder.

Specifically, the one pair of first airbags 30 are installed in a backrest 12 of a seat 11 on which the passenger sits, respectively, and are inflated and deployed in the forward direction and in the upward and downward directions from both sides of the backrest 12 to restrict both sides of the lower body part from the passenger's shoulder.

The first airbags 30 may be received in the backrest 12 of the vehicle in a folded state, and may be provided as side airbags to restrict and protect both sides of the passenger's upper body part and lower body part.

The second airbag 40 is installed in a headrest 13 installed on an upper end of the backrest 12, and is inflated in the forward direction and in the upward and downward directions from both sides of the passenger's head to restrict the passenger's head and both sides of the upper end of the passenger's shoulder.

The second airbag 40 may be received in the headrest 13 in a folded state, and may be supplied with gas from the inflater upon vehicle collision and may be inflated and deployed to the outside of the headrest 13 through a cutting line formed on a rear surface of the headrest 13.

The second airbag 40 may be inflated and deployed substantially in an inverted U shape (∩) when viewed above.

That is, when the second airbag 40 is deployed, the second airbag 40 may be inflated and deployed, such that a center 41 of the second airbag 40 is disposed on a rear side of the head rest 13, and both ends 42 of the second airbag 40 are disposed on both sides of the passenger's head, respectively.

Herein, the both ends 42 of the second airbag 40 may be disposed further inside than upper ends of the one pair of first airbags 30 to overlap the upper ends of the one pair of first airbags 30, respectively.

Accordingly, the both ends 42 of the second airbag 40 may be caught and supported by the upper ends of the one pair of first airbags, respectively, when they move toward one side.

Although it is illustrated in the present embodiment that the both ends 42 of the second airbag 40 are disposed further inside than the upper ends of the one pair of first airbags 30, the present disclosure is not limited thereto.

Figure 4:
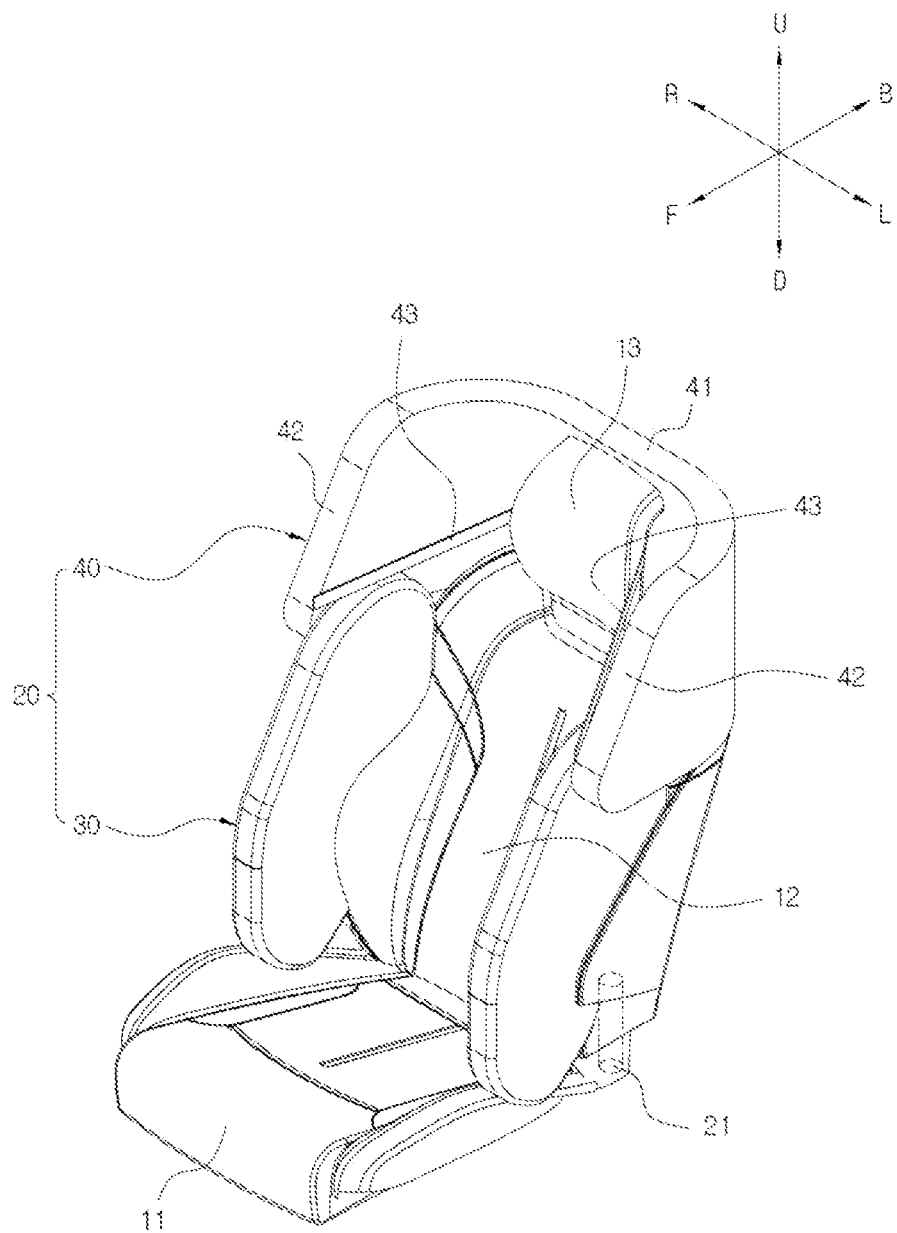
FIG. 4 is a perspective view of an airbag apparatus for a vehicle according to another embodiment of the present disclosure.
Figure 5:
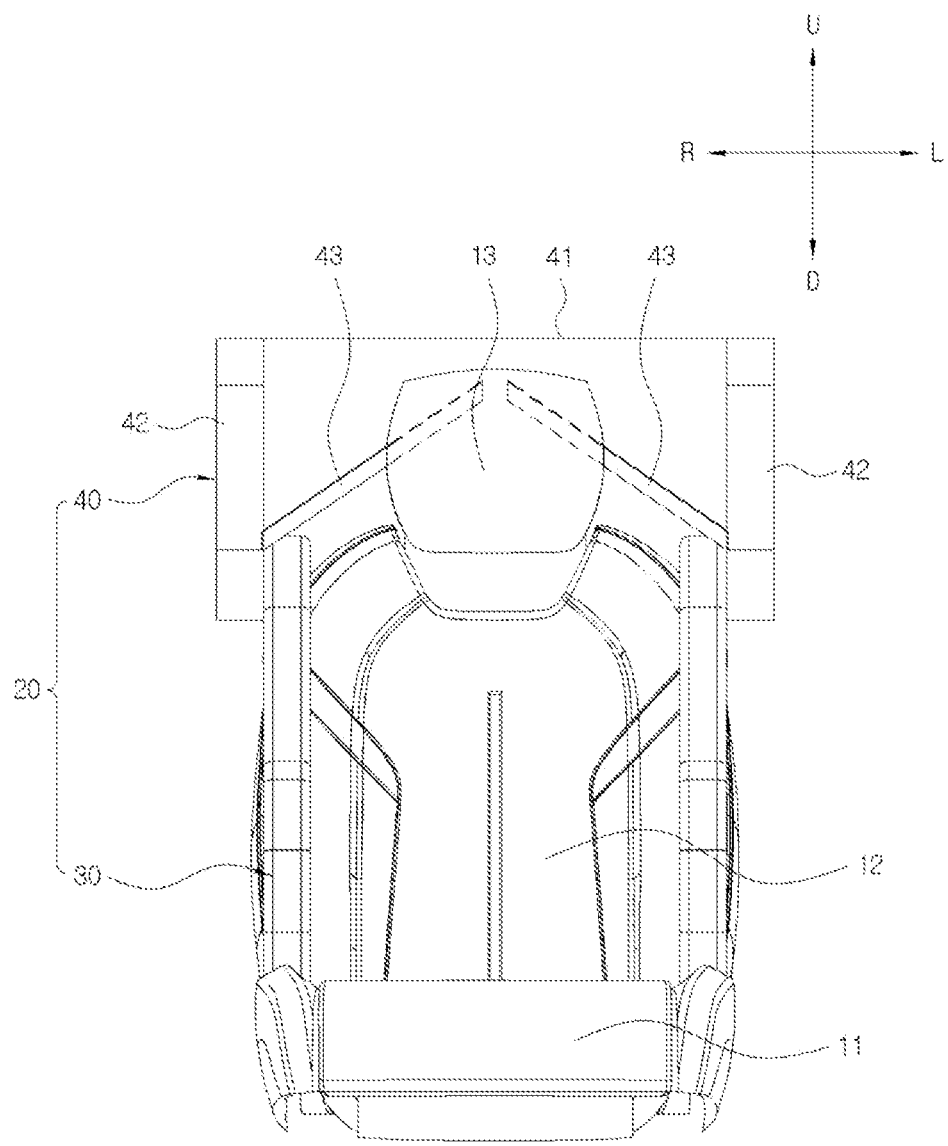
FIG. 5 is a front view of the airbag apparatus for the vehicle shown in FIG. 4.

FIG. 4 is a perspective view of an airbag apparatus for a vehicle according to another embodiment of the present disclosure, and FIG. 5 is a front view of the airbag apparatus for the vehicle shown in FIG. 4.

As shown in FIGS. 4 and 5, the airbag apparatus 10 for the vehicle according to another embodiment of the present disclosure is the same as the configuration of the airbag apparatus 10 described above with reference to FIGS. 1 to 3, and is different therefrom in that the both ends 42 of the second airbag 40 are disposed further outside than the upper ends of the one pair of first airbags 30.

That is, the second airbag 40 may be inflated and deployed substantially in an inverted, squared U shape ('⊓') when viewed above.

Accordingly, when the passenger's upper body or lower body moves toward one side, for example, to the left side, due to lateral collision of the vehicle, and the first airbag 30 on the left is pushed out, the corresponding first airbag 30 may be supported on the left end 42 of the second airbag 40 to effectively prevent or restrain movement of the passenger.

Herein, one pair of tethers 43 may be installed on the second airbag 40 to limit an inflation deployment shape.

One end of each tether 43 may be connected to a center of a front surface of the second airbag 40, and the other end of each tether 43 may be connected to the both ends 42 of the second airbag 40.

Of course, the present disclosure is not necessarily limited thereto, and the number of tethers, connection positions, length, etc. may be variously changed according to the size, deployment shape of the second airbag.

For example, a plurality of pairs of tethers 43 may be provided or both ends of one tether 43 may be connected to the both ends 42 of the second airbag 40, respectively.

In addition, both ends of the tether 43 may be connected to the headrest 13 and the both ends 42 of the second airbag 40, respectively.

Although it is illustrated in the above-described embodiments that the first airbags are disposed on both sides of the backrest, the present disclosure is not limited thereto.

Figure 6:
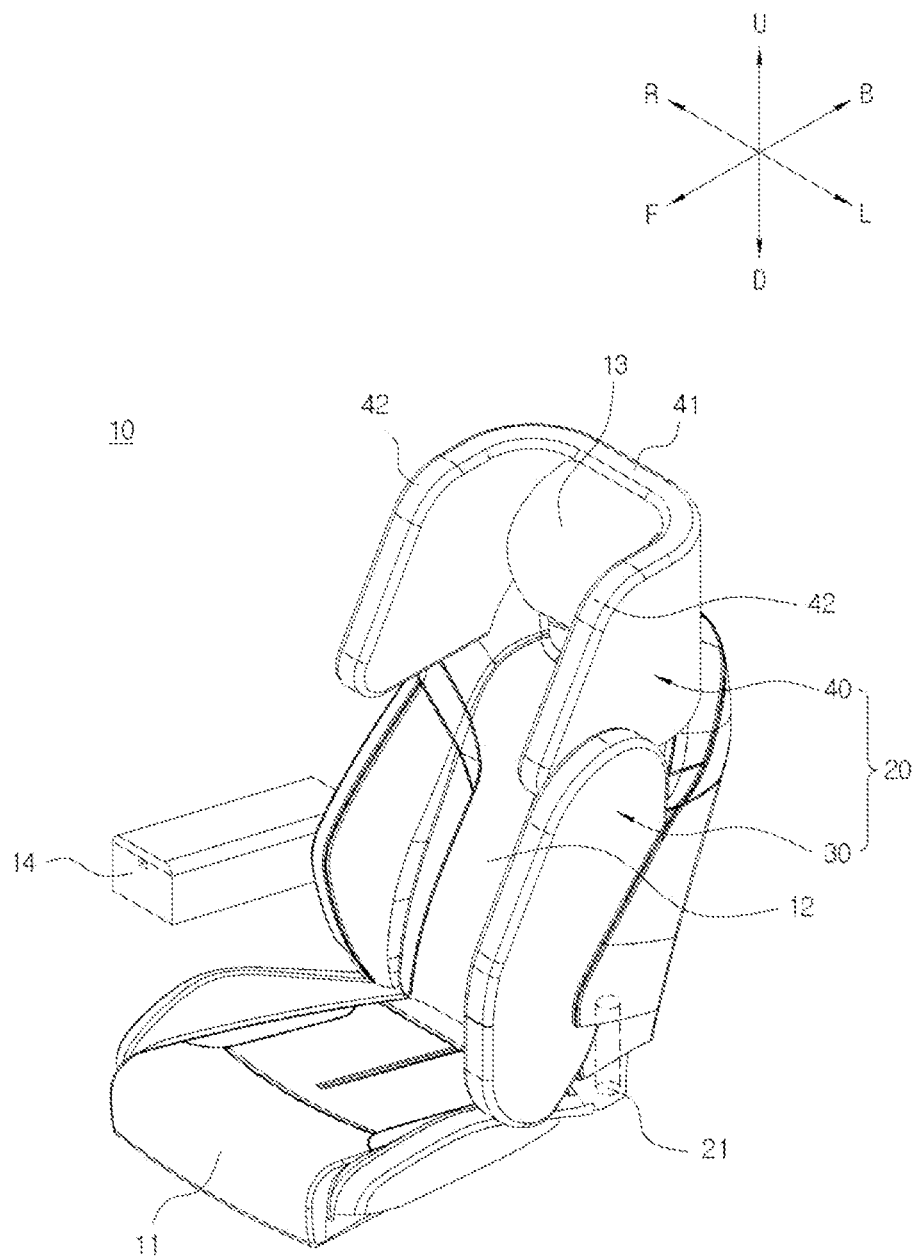
FIG. 6 is a perspective view of an airbag apparatus for a vehicle according to still another embodiment of the present disclosure.

For example, FIG. 6 is a perspective view of an airbag apparatus for a vehicle according to still another embodiment of the present disclosure.

As shown in FIG. 6, the airbag apparatus 10 for the vehicle according to still another embodiment of the present disclosure is the same as the configuration of the airbag apparatus 10 for the vehicle described above with reference to FIGS. 1 to 5, and is different therefrom in that an armrest 14 is installed on one side of the backrest 12.

Herein, the armrest 14 may perform a function of comfortably supporting passenger's arm when the passenger places his/her arm thereon, and may also perform a function of preventing or restraining the passenger from moving toward the opposite side of collision upon lateral collision of the vehicle.

When the armrest 14 is installed on one side of the seat 11, for example, on the right side, as described above, the first airbag 30 installed on the right side of the backrest 12 may be removed, and one first airbag 30 may be installed on the left side of the backrest 120.

Of course, the present disclosure is not limited thereto, and may be changed to have the first airbag 30 installed only on one side of the backrest 12 when a support structure to prevent lateral movement of the passenger, like the armrest 14 or a console box, is provided on one side of the seat 11.

Through the above-described process, the present disclosure can restrict and protect the passenger's upper body and lower body by inflating and deploying the first and second airbags on both sides of the passenger upon vehicle collision.

That is, the present disclosure has the first airbag installed in the backrest of the seat of the vehicle, and the second airbag installed in the headrest, thereby restrict passenger's body and head upon vehicle collision.

In particular, the present disclosure has the second airbag disposed to overlap the upper end of the first airbag, thereby effectively preventing or restraining movement of the passenger caused by lateral collision of the vehicle.

Accordingly, the present disclosure can safely protect a passenger by effectively restricting the passenger in a state where a seat and a backrest are rotated in various directions and angles in an autonomous vehicle.

Although the invention made by the inventors of the present application has been specifically described according to the above embodiments, the present disclosure is not limited to the above embodiments, and may be modified variously within a scope of the technical essence of the present disclosure.

INDUSTRIAL APPLICABILITY

The present disclosure is applied to technology of an airbag apparatus for a vehicle which safely protects a passenger by restricting the passenger by inflating and deploying airbag cushions from both sides of the passenger upon vehicle collision.

The invention claimed is:
1. An airbag apparatus for a seat of a vehicle, the airbag apparatus comprising:
 an airbag cushion inflatable and deployable in a forward direction from both sides of a passenger upon vehicle collision to protect both sides of the passenger; and
 an inflater configured to generate gas by an impact detection signal and to supply the gas to the airbag cushion,
 wherein the airbag cushion comprises a first side airbag deployable from a first lateral side of a backrest of the seat, the first side airbag configured to protect one side from passenger's shoulder to passenger's lower body part, and
 a second airbag inflatable to a U-shape configured to protect passenger's head and both sides of passenger's shoulder, the U-shape including first and second portions forwardly extending from a central portion,
 wherein a lower end of the first portion overlaps an upper end of the first side airbag in a lateral direction.

2. The airbag apparatus of claim 1, wherein the second airbag is received in a headrest in a folded state, and wherein the second airbag is supplied with gas upon vehicle collision and is inflated and deployed to an outside through a cutting line formed on the headrest.

3. The airbag apparatus of claim 1, wherein when the second airbag is deployed, a center of the second airbag is disposed on a rear side of a headrest, both ends of the second airbag are inflated and deployed in a forward direction and in upward and downward directions from both sides of the passenger's head, wherein the both ends of the second airbag overlap an upper end of the first side airbag in the lateral direction upon deployment.

4. The airbag apparatus of claim 3, wherein the both ends of the second airbag are disposed further inside than the upper end of the first side airbag and are supported by the first side airbag to prevent or restrain lateral movement of the passenger's head upon lateral collision of the vehicle.

5. The airbag apparatus of claim 3, wherein the both ends of the second airbag are disposed further outside than the upper end of the first side airbag and support the first side airbag to prevent or restrain lateral movement of passenger's body upon lateral collision of the vehicle.

6. The airbag apparatus of claim 3, wherein a tether is installed on the second airbag to limit an inflation deployment shape of the second airbag.

7. The airbag apparatus of claim 1, further comprising a second side airbag deployable from a second lateral side of the seat.

8. The airbag apparatus of claim 1, wherein only one side airbag is installed on the first lateral side of the backrest of the seat, and a support structure is installed on a second lateral side of the backrest to prevent lateral movement of the passenger.

9. The airbag apparatus of claim 1 in combination with the seat.

10. An airbag apparatus in combination with a seat of a vehicle, the airbag apparatus comprising:
   a first side airbag deployable in a forward direction from a first lateral side of a backrest of the seat;
   a second side airbag deployable in the forward direction from a second lateral side of a backrest of the seat; and
   a further airbag inflatable to a U-shape, the further airbag including a central portion configured and positioned to inflate on a rear side of a headrest of the seat and first and second portions configured to forwardly extend from the central portion upon deployment of the further airbag,
   wherein lower ends of the first and second portions overlap upper ends of the first and second side airbags in a lateral direction.

11. The airbag apparatus of claim 10, wherein the lower ends of the first and second portions are disposed inboard of the upper ends of the first and second side airbags, respectively.

12. The airbag apparatus of claim 10, wherein the lower ends of the first and second portions are disposed outboard of the upper ends of the first and second side airbags, respectively.

13. The airbag apparatus of claim 10, further comprising first and second tethers connecting the headrest of the seat with the first and second portions of the further airbag, respectively.

* * * * *